United States Patent [19]

Asaro

[11] 4,087,187
[45] May 2, 1978

[54] LOCKING MECHANISM FOR EXTENSION RODS

[76] Inventor: Vincent Asaro, 56 Mulberry La., Freehold, N.J. 07728

[21] Appl. No.: 718,962

[22] Filed: Aug. 30, 1976

[51] Int. Cl.² ............................................. F16B 7/14
[52] U.S. Cl. ..................................... 403/104; 403/351
[58] Field of Search ......... 403/350, 351, 104, DIG. 8, 403/109

[56] References Cited

U.S. PATENT DOCUMENTS

| | | | |
|---|---|---|---|
| 2,473,351 | 6/1949 | Thompson | 403/104 X |
| 2,526,415 | 10/1950 | Refsdal | 403/351 |
| 3,259,407 | 7/1966 | Welt | 403/350 |
| 3,560,032 | 2/1971 | Cohen et al. | 403/104 |
| 3,771,785 | 11/1973 | Speyer | 403/104 X |
| 3,897,621 | 8/1975 | Fedrigo | 403/350 X |

*Primary Examiner*—Andrew V. Kundrat
*Attorney, Agent, or Firm*—Charles I. Brodsky

[57] ABSTRACT

The described locking mechanism permits two or more rods to be quickly fitted together and adjusted to a fixed, predetermined length. The locking mechanism is of a type such that the rotation of the rods by approximately 45°–90° automatically fixes the rods in place.

1 Claim, 7 Drawing Figures

U.S. Patent    May 2, 1978    4,087,187
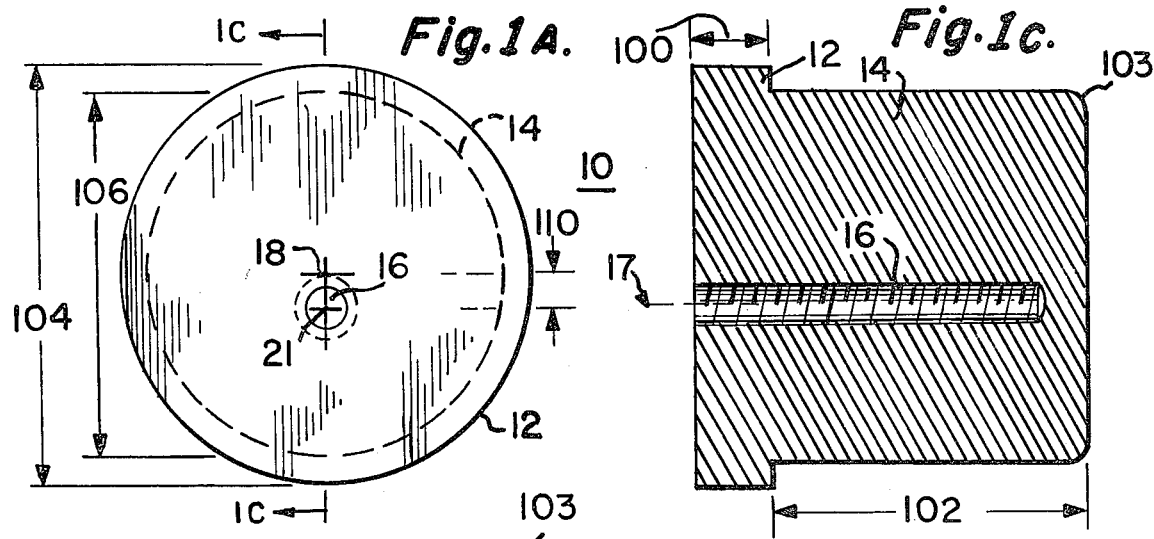
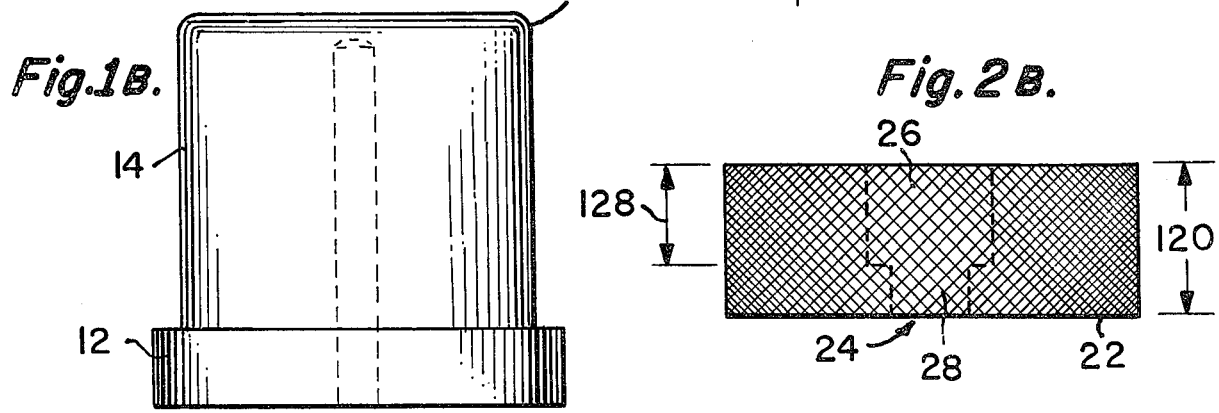
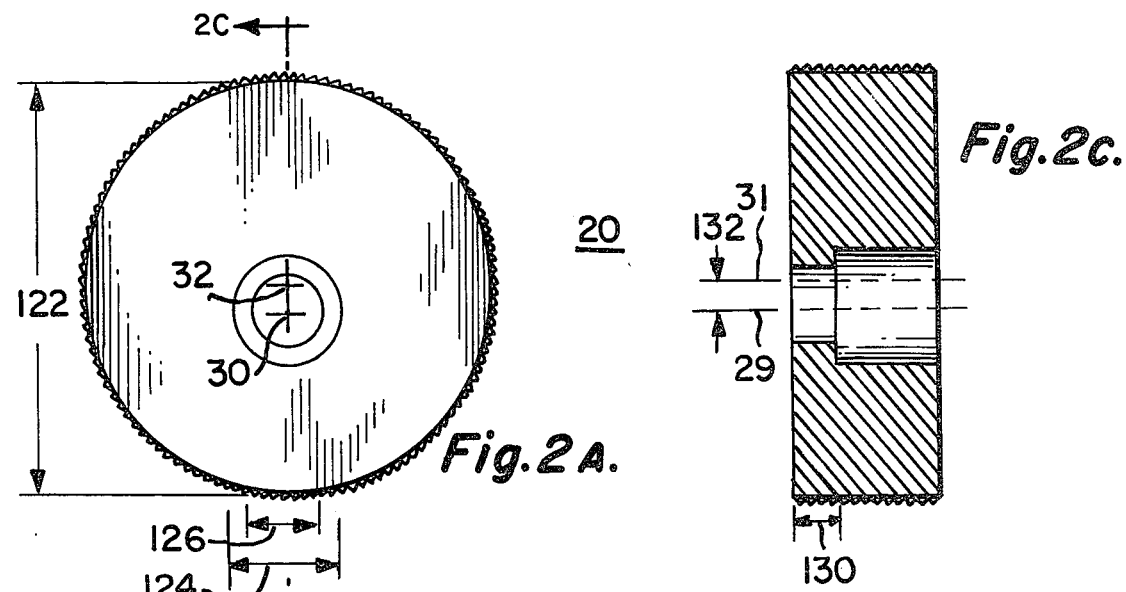
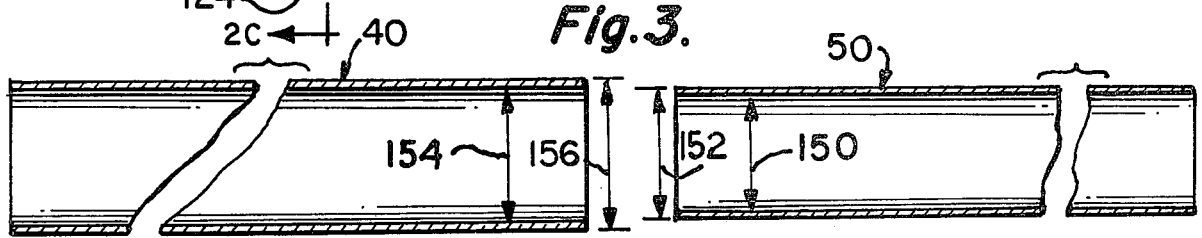

LOCKING MECHANISM FOR EXTENSION RODS

FIELD OF THE INVENTION

This invention relates to extension rods, in general, and to a locking mechanism operative to permit quick and easy adjustment of the rods in length and to hold them fixed, in particular.

SUMMARY OF THE INVENTION

As will become clear hereinafter, the locking mechanism of the invention is of a cross-section corresponding to that of the rods employed. In a preferred embodiment, a housing of circular cross-section has situated within it a channel eccentrically disposed with respect to its longitudinal axis. A knurled knob is provided, also having a circular cross-section and an aperture disposed eccentrically with respect to its longitudinal axis. A holding screw, or similar such device, for example, joins the knob and housing together, passing through the aperture in the one and into the channel of the other. As will be seen, the dimensions selected for these components will be such that the knob will be permitted to rotate freely with respect to the housing when the locking mechanism is inserted into a tubular rod with the housing end first. When the locking mechanism and rod are then inserted into a second rod to be joined, the overall length can be easily adjusted by moving one rod longitudinally with respect to the other. The locking mechanism is such, however, that when one of the rods is twisted about the other, the relative eccentricities produce an outward movement of the knob relative to the housing, causing it to bear against the inside of the second rod into which it was placed in making the join, thereby holding the two rods fast in position.

It will be readily apparent that such a locking mechanism and rod combination can find a wide variety of applications. It can be used, for example, as an anti-jimmie bar in preventing forced opening of patio doors, to fixedly provide adjustable length rods for draperies and shower curtains, and to outfit long handle brooms, vacuum cleaner attachments, paint brushes, garden tools, flag poles, and the like. It can also be used as a clothes rack pole for transporting clothing in an automobile, amongst a multitude of other uses. All that is necessary in locking the rods once a desired length is predetermined is a rotation of the rods by a twisting of the hands; all that is necessary to unlock the rods is an opposite, twisting rotation.

BRIEF DESCRIPTION OF THE DRAWING

These and other features of the present invention will be more clearly understood from a consideration of the following description taken in connection with the accompanying drawing in which:

FIGS. 1A, 1B and 1C are a top view of the housing component of the preferred locking mechanism, a front view thereof, and a sectional view taken along the sectional lines 1C—1C of FIG. 1A, respectively;

FIGS. 2A, 2B and 2C are a top view of the knob component of the mechanism, a front view thereof, and a sectional view taken along the sectional lines 2C—2C of FIG. 2A; and FIG. 3 shows the relationship of a pair of rods to be fitted together and locked together by the mechanism of FIGS. 1 and 2.

DETAILED DESCRIPTION OF THE DRAWING

In FIGS. 1A, 1B and 1C, the housing of the locking mechanism 10 is shown as it would be used to connect two tubular rods together and to lock them in place. (While, the preferred embodiment of the invention employs aluminum components for the housing and knob of the locking mechanism, it will be understood that plastic or other material may alternatively be used.) The housing 10 will be seen to comprise a cylindrical face section 12 and a cylindrical body section 14. The length of the face section 12 is represented by the reference numeral 100, the length of the body section 14 by the reference numeral 102, and a curvature, if desired, being given to the edges of the body section 14, as represented by the reference numeral 103. Additionally, the reference numerals 104 and 106 indicate the diameter dimensions of the cylindrical face 12 and of the cylindrical body 14, respectively. In one embodiment of the invention, the dimensions of the housing 10 were designed as follows:

| Length | 100 | 0.125 inches |
|---|---|---|
| Length | 102 | 0.562 inches |
| Curvature | 103 | 0.062 inches radius |
| Diameter | 104 | 0.750 inches |
| Diameter | 106 | 0.650 inches | machined to a tolerance of ± 0.005 inches.

In accordance with the invention, a channel or blind bore 16 is drilled inwardly of the housing 10 to eventually receive a holding screw or similarly such fastening device — for example, an Allen screw of ¼-20 classification. As will be seen from the drawing of FIG. 1, the longitudinal axis 17 of the channel 16 is eccentrically disposed with respect to the longitudinal axis 18 of the housing 10 by an amount represented by the reference notation 110. The central point of the circular face 12 is indicated at 18 and the central point of the channel 16 is shown at 21, both in FIG. 1A.

In FIGS. 2A, 2B and 2C, the knurled knob 20 comprises a cylinder 22 having a length represented by the reference numeral 120 and a diameter dimension indicated by the reference notation 122. A two-part, generally cylindrical channel or through aperture 24 is fabricated internal to the knob 20, having a wider portion 26 to receive the head of the Allen screw used as a fastening device and a narrower portion 28 used to accept the shank portion of the Allen screw. The respective diameters for these two cylindrical sections 26, 28 are shown by the reference numerals 124 and 126. The length of the section 26 and the length of the section 28 are also indicated, represented by the reference notations 128 and 130 respectively. As illustrated, the longitudinal axis 29 of the channel 24 is eccentrically disposed with respect to the longitudinal axis 31 of the knob 20 by an amount represented by the reference numeral 132. The central point of the channel 24 is indicated at 30 and the central point of the face of the cylindrical knob 20 is shown at 32. In this preferred embodiment of the invention, the dimensions of the knob 20 were designed as follows:

| Length | 120 | 0.375 inches |
|---|---|---|
| Diameter | 122 | 0.765 inches |
| Diameter | 124 | 0.375 inches |
| Diameter | 126 | 0.250 inches |

| Length | 128 | 0.250 inches | also machined to a tolerance of ± 0.005 inches.

In accordance with the present invention, furthermore, the amount of the eccentricity as respects the housing 10 and as respects the knob 20 is selected the same in each instance. Although the precise amount of the eccentricity is adjustable, applicant has found that if limited between 0.090 and 0.100 inches, the ease with which tubular rods can be reasily fitted together and fixedly held in place is enhanced. In the specific embodiment of the invention described, the eccentricities 110 and 132 were each selected to 0.090 inches, and machined to a tolerance of 0.005 inches. As will be readily appreciated by one skilled in the art, this degree of eccentricity should continue, in providing the operation described below, regardless of the diameters selected for the component parts of the housing 10 and of the knob 20. That is, the degree of eccentricity is to continue independent of the inner diameters of the tubular rods to be connected.

FIG. 3 illustrates two tubular rods 40, 50 which are to be joined together and adjusted to a fixed predetermined length. Each rod can be of stock material, commonly available in lengths of 2 to 16 feet. When used in accordance with the locking mechanism of the invention, the rods 40 and 50 could thus be fitted together to form an overall length anywhere from slightly in excess of 2 feet to slightly less than 32 feet. According to the invention, as respects the rod 50, its inner diameter 150 is substantially equal to the diameter 106 of the housing body section 14. At the same time, the outer diameter 152 of the rod 50 is substantially equal to the diameter 104 of the face portion 12 of the housing 10. In like manner, as respects the rod 40, its inner diameter 154 is slightly larger than the diameter 122 of the knob 20 and the eccentricity 132 of the two part channel 24. It will be understood, however, that in actually designing and utilizing the locking mechanism of the invention to fit two rods together, the locking mechanism is designed to work with the specifications of the rods, rather than the rods 40 and 50 being designed to meet the dimensional specificiations of the locking mechanism. Thus, the dimensions of the locking mechanism previously set forth would be understood to work in conjunction with the dimensions of the tubular rods listed below, in which the reference numeral 156 represents the outer diameter of the rod 40:

| Inner diameter 150 | 0.650 inches |
| Outer diameter 152 | 0.750 inches |
| Inner diameter 154 | 0.775 inches |
| Outer diameter 156 | 0.875 inches | also machined to a tolerance of ± 0.005 inches, and with an eccentricity of 0.090 inches.

In the operation of the invention, the housing 10 and knurled knob 20 are fastened together by the Allen screw (or similar device), in such manner that the screw extends through the portion 26 of the channel 24 through the section 28 and into the channel 16 of the housing 10. The locking mechanism is then force, or otherwise, fitted within the rod 50 such that the body section 14 is fully inserted, and such that the face section 12 bears against the outer edge of the rod 50. By selecting the diameter 104 of the face portion 12 equal to the outer diameter 152 of the rod 50, the mechanism is thus prevented from falling inwardly of the rod 50. The mechanism is held firmly in place by virtue of the equal diameter 106 of the body section 14 and the inner diameter 150 of the rod 50.

With the arrangement as thus far described, both the face portion 12 of the housing 10 and the knurled knob 20 protrude outwardly from the tubular rod 50. With the relative dimensions selected, the knob 20 is able to be rotated about the Allen screw, and in so doing, traces an eccentric path with respect to the face portion 12 of the housing 10 held fixedly in place. The tubular rod 50, with the locking mechanism secured, is then fitted into the larger tubular rod 40, and by an amount to establish the overall predetermined length of the extension rod. Once that length is established, all that is necessary to lock the mechanism and the rods in place is to rotate one of the rods, for example, the rod 50, inwardly of the plane of the paper for the configuration illustrated. The eccentric rotation of the knob 12 about the Allen screw causes the outer surface of the knob 12 to bear against the inner surface of the rod 40, whereat it is held in place. The outer surface of the knob 20 can be scored or knurled, as shown, to provide an added frictional force to supplement the holding action desired. To unloosen the two rod sections, all that is then necessary is to rotate the rod 50 back to its original position — which, for the design of the invention, will take somewhere between a 45° and a 90° rotation. Continued rotation in that direction, i.e., out of the plane of the paper, would again ultimately cause a point to be reached at which a second locking position occurs. In such event, the two rods can be loosened by again rotating back towards the initial starting point. In each case, it will be seen that it is the eccentric movement of the knob 12 which brings the mechanism of the invention to the "lock" or "unlock" positions.

As will be readily apparent, the remote ends of the rods 40 and 50 could be equipped with rubber or plastic cushions to serve as a protection for the wall to which the rod might extend when being used for hanging curtains, draperies or clothing. Alternatively, the remote end of one rod might be notched so as to enable it to be connected to a paint brush or floor brush, to be used in painting or as a broom, for example. Many other applications will readily present themselves, in accordance with which the locking mechanism of the invention will operate as described, independently of the length of the rods or of their diameters. Equally obvious will be the fact that additional lengths of rod could be connected in this manner, if added lengths in excess of 32 feet were desired.

While there has been described what is considered to be a preferred embodiment of the present invention, it will be apparent to those skilled in the art that modifications may be made wihtout departing from the scope of the teachings herein of utilizing and eccentrically offset knob in the locking of tubular rods to be connected together as an adjustable extension pole. Thus, it will be understood that the use of two part channel 24 to receive the Allen screw performs primarily a cosmetic function in permitting the wider "head" of the holding device to be seated below the surface of the knob 20 when the knob is secured to the housing 10. For at least this reason, therefore, reference should be made to the appende claims for a determination of the extend of this invention.

What is claimed is:

1. A locking mechanism for use in joining together two tubular extension rods to be fixedly secure in withstanding external pressures comprising:

- a housing having a longitudinal axis and a threaded blind bore parallel thereto, but offsettingly disposed with respect therewith;
- a knob having a knurled outer periphery and also having a longitudinal axis and a through aperture parallel thereto, but offsettingly disposed with respect therewith; and
- said knob aperture having a counterbore to receive the head of a fastening means and which counterbore has an axial length greater than half the total axial length of said aperture;
- a headed fastening means for joining said housing and knob together, said means being so disposed and arranged as to pass between the aperture in said knob and the blind bore of said housing;
- wherein said housing and said knob are of circular cross-section and wherein the blind bore and aperture thereof are each eccentrically disposed with respect to their respective longitudinal axes;
- wherein the amount of eccentrical dispositions of said blind bore and aperture as regards their respective longitudinal axes are substantially equal;
- wherein the eccentrical dispositions of said blind bore and aperture as regards their respective longitudinal axes is in the range 0.090 to 0.100 inches, to a tolerance of ± 0.005 inches, to provide a resistance to movement under external pressures tending to loosen the join between said extension rods;
- wherein said housing comprises an enlarged cylindrical face section and a reduced cylindrical body section, wherein said knob comprises a cylindrical section, and wherein the diameter of said cylindrical knob section is slightly in excess of the diameter of said cylindrical face section;
- and wherein the diameter of said cylindrical body section is substantially equal to the inner diameter of one of said rods, wherein the diameter of said cylindrical face section is substantially equal to the outer diameter of said one rod, and wherein the diameter of said cylindrical knob section is less than the inner diameter of the other of said rods by an amount slightly in excess of the eccentrical dispositions of said blind bore and said aperture as regards their respective longitudinal axes.

* * * * *